United States Patent [19]

Moorhead et al.

[11] Patent Number: 5,198,979
[45] Date of Patent: Mar. 30, 1993

[54] SEISMIC MIGRATION OF MULTIPROCESSOR COMPUTER

[75] Inventors: William D. Moorhead; Richard L. Gregg, both of Houston; Donald M. Tolle, Sugar Land, all of Tex.

[73] Assignee: Shell Oil Company, Houston, Tex.

[21] Appl. No.: 412,692

[22] Filed: Sep. 26, 1989

[51] Int. Cl.$^5$ .............................................. G01V 1/30
[52] U.S. Cl. ..................................... 364/421; 367/38; 367/72
[58] Field of Search .................. 364/422, 421, DIG. 1, 364/DIG. 2, 422, 421; 367/51, 53, 38, 58, 69, 72

[56] References Cited

U.S. PATENT DOCUMENTS 5,050,069  9/1991  Hillis et al. ................... 364/DIG. 1
5,138,584  8/1992  Hale ................................. 367/53

OTHER PUBLICATIONS

V. J. Madisetti and D. G. Messerschmitt, Seismic Migration Algorithms On Parallel Computers, 3rd Conf. on HyperCube Concurrent Computers & Applications, vol. II-Applications, 1988, pp. 1180–1186.

W. A. Schneider, Integral Formulation for Migration In Two and Three Dimensions, Geophysics, vol. 43, Nos. 1, 3–7, 1978, pp. 49–76.

D. Forel, G. H. F. Gardner, "A Three–Dimensional Perspective on T·vo–Dimensional Dip Moveout, Geophysics", vol. 53, No. 5, May 1988, pp. 604–610.

S. M. Deregowski, "What is DMO?", First Break, vol. 4, No. 7, Jul. 1986.

Enders A. Robinson, "Migration of Geophysical Data", Book, IHRDC, Publishers, Boston, Mass., Copyright 1983 (not included here).

Primary Examiner—Roy N. Envall, Jr.
Assistant Examiner—A. Bodendorf

[57] ABSTRACT

In a preferred embodiment of the present invention, methods are provided for Kirchhoff-migrating seismic data using a parallel computer. The methods of the present invention preferably use a multiprocessor machine that is interconnected to form a hypercube. The presently preferred method is to build up one or more migrated output traces in each processor (node) designated as a "migration" processor, as input traces are passed from migration node to migration node along a nearest-neighbor chain. When an output trace is completed, it is sent by a migration node to storage via an appropriate I/O processor and the migration node beings building a new output trace. There is essentially no limit to the length of seismic line which can be so migrated. Alternatively, the input traces may be held in the migration nodes and the output traces passed from node to node along a nearest-neighbor chain, or the input and output traces may be passed in opposite directions along the chain. Further, the use of multiple migration chains allows for efficient operation over a wide range of number of available processors.

25 Claims, 6 Drawing Sheets

SEISMIC MIGRATION OF MULTIPROCESSOR COMPUTER

BACKGROUND OF THE INVENTION

This invention relates to seismic exploration, and more particularly relates to processing of seismic data on multiprocessor computers.

Conventional land or marine seismic acquisition techniques involve the use of an appropriate source (or sources) to generate seismic energy and a set of receivers, spread out upon or near the surface of the earth on land, or near the water surface or water bottom in a water-covered area, to detect any reflected seismic signals due to seismic energy striking subsurface geologic boundaries. In simplistic terms, this seismic acquisition process has a seismic wave, from a source of seismic energy, travelling down into the earth, reflecting from a particular geologic interface (i.e. a change or contrast in elastic constants and/or densities) and returning to the surface, where it may be detected by appropriate receivers. These seismic signals are recorded in time, and subsequent processing of these signals, i.e. seismic "traces" or seismic data, is designed to reconstruct an appropriate image of the geologic boundaries of the subsurface and to obtain information about the subsurface materials.

One important seismic processing technique to provide this subsurface image is called migration. In general terms, seismic migration takes a set of seismic data (the seismic traces) measured at or near the surface of the earth (or water), and produces a representation of the subsurface of the earth. Generally, seismic processing techniques which perform migration are based on solving some form of a propagation or wave equation (which describes the propagation of seismic waves in the subsurface), or an approximation thereof.

There are several main types of migration processing techniques; one type is called Kirchloff migration, which approximates the evaluation of the so-called Kirchhoff integral solution to the wave equation. Kirchhoff migration techniques generally work by producing an output seismic trace (usually sampled in depth or 2-way vertical traveltime) by (1) performing a local interpolation on each input trace that falls within some determined neighborhood of a desired output trace location (herein referred to as an "output subpoint"), and (2) summing the interpolated traces within that neighborhood to provide the output trace for that output subpoint. This neighborhood is called the "migration operator." The size and shape of the migration operator may be fixed or may vary from output subpoint to output subpoint. Proper specification of an operator may be very complicated due to such considerations as aliasing, source/receiver geometry, the seismic velocity function, and the dips of reflection events. In the case of two-dimensional (2-D) migration, the sum of the left and right extremes of the operator is termed the operator "width." Typically, Kirchhoff migration operator widths range from 2 to 10 miles, so many input traces contribute to each output trace, and conversely, an input trace contributes to many output traces.

Various types of computers may be employed to process the seismic data and compute various outputs to form an approximated image of the subsurface and to provide related information about subsurface materials. The amount of seismic data to be processed by a computer may vary considerably. For example, a moderately sized 3-D marine seismic survey of a 12 mile by 7 mile rectangle would typically consist of about 2800 miles or more of data. It would take about 3 weeks to acquire this data.

It is estimated that it would take about 4 weeks to 2-D "stack"-migrate such a survey on a Unisys plus an array processor, that is to migrate the data after it is "stacked" via common midpoint techniques or other such techniques. In a similar manner, it is estimated that it would take about 4.3 years to "points"-migrate this survey in a 2-D manner on a Unisys plus an array processor, that is to migrate the date before it is "stacked"; migration before stacking involves migration of all the recorded seismic traces, rather than migration of a reduced volume of averaged or stacked seismic traces, when stacked data is employed. The time for a 3-D points migration of this survey on a Univac plus an array processor is estimated to be about 1,000 years. The time to perform a 3-D points migration of this survey on a Cray X-MP/14 is estimated to be about 20 years.

Thus, it can be seen that it takes an inordinate amount of time and cost to migrate moderate amounts of seismic data even with today's supercomputers. Seismic migration utilizes a large amount of computer resources, even though its computations are simple, because of the large numbers of computations and data flow required. Accordingly, unless the time and cost to perform seismic migration is reduced, such techniques will be used infrequently. Thus, faster computers are needed to reduce such migration times.

However, the computer industry is finding it increasingly difficult to make fast computers run even faster. The rate of increase, in the increase of speed, of the fastest electronic circuits and components is declining. The fastest general-purpose supercomputers today have theoretical maximum speeds in the range of 200–2000 million floating point operations per second (MFLOPS), but on typical computational problems they achieve only ten or twenty percent of their theoretical speed. It is unlikely that supercomputers built in the current, traditional way will more than double in speed by the 1990's.

One way to get faster processing speed without faster components is to use concurrency of one kind or another. This has led to the design and construction of various kinds of multiprocessor or "parallel" computers. There is some disagreement about the most effective way of obtaining concurrency for such parallel computers, i.e. how best to connect the processors of such a parallel computer together, as well as how many processors and of what type to employ. Some of the companies that currently build supercomputers are building large-grain parallel computers, i.e. those with relatively small numbers of very fast and powerful processors. Other parallel computers are medium-grain machines, i.e. employing a large number (hundreds to a few thousands) of relatively slow processors that are somehow connected together, or fine-grain machines, i.e. employing thousands or more of very simple, slow processors that are somehow connected together. Such medium-grain machine processors may be any type of processor, but are typically microprocessors.

Microprocessors are still experiencing a rapid increase in their speeds of execution, both for floating point operations and other instructions; the performance rate for these other instructions is usually measured in millions of instructions per second (MIPS). In a similar manner, the capacity of semiconductor memory chips is increasing rapidly while their cost is decreasing rapidly, to provide more and cheaper memory for such microprocessors.

Thus, the medium- to fine-grain parallel computer approach is especially promising, since it reasonably may be expected that the rapid rate of progress being made today in microprocessor technology and memory chips will continue for at least another decade. This is in sharp contrast to the expected slower rate of progress regarding the speeding up of the highest-speed electronic components.

For a medium-grain parallel machine, each microprocessor may be capable of executing its own program independently of the others and may have large floating-point processing power. Further, each microprocessor may be linked to a selected subset of the others via serial communication lines. The linkage between such microprocessors may be such that the communication lines constitute the edges of an n-dimensional "hypercube" with the microprocessors as the vertices. Data exchange between such microprocessors is regulated by the programs running in the microprocessors in question. Currently, fine-grain parallel machines do not have large floating-point processing power nor do all the processors operate independently, although they may be interconnected to form a hypercube.

"Hypercubes" of various dimension are defined as follows. A zero-dimensional hypercube consists of a single node labelled with a zero. For n>zero, an n-dimensional hypercube is formed from two (n−1)-dimensional hypercubes, by connecting each node in one to the correspondingly labelled node in the other with a communication path "along the n-th dimension," and then re-labelling all the nodes in one of the two (n−1)-dimensional hypercubes by adding $2^{(n-1)}$ to each of its labels. Thus, an n-dimensional hypercube has $2^n$ nodes, each of which is connected to another node along each of n dimensions; the nodes are labelled from 0 through $2^n - 1$.

In a 10-dimensional (10-D) hypercube multiprocessor computer each processor or node is connected via 10 communication paths to 10 other nodes; such communication paths may employ full-duplex ports. Other node ports may be connected to a global broadcast bus or other I/O channels or devices. An I/O port of each node may be able to accept data that is broadcast over such a global bus, as well as carry on a full-duplex exchange of data with one or more of the other nodes of the hypercube at the same time.

A hypercube system and disks may be controlled by a host computer that contains its own multi-user, multitasking operating system. The host computer may be responsible for loading the hypercube programs and management of the hypercube resources. In order to execute a program on the hypercube, a user initiates execution of his host program, which in turn causes the node programs to be loaded onto the appropriate processing nodes. A program, having been loaded onto a processing node, begins execution under that node's own control. Messages passed between the processors and the host program may provide input-output data or additional control.

A hypercube system may also have a high-speed graphics subsystem that allows data residing on the host or in the hypercube nodes to be displayed on an attached high-resolution, color-graphics screen. A multichannel high-speed input-output device that will allow attachment to combinations of tape, external disk, high-speed data communications channel, or satellite computer may be used to provide direct input-output with the hypercube processor nodes.

However, if a hypercube machine, or any other type of medium-to fine-grain parallel machine, is to be used to Kirchhoff-migrate seismic data with the expectation of short execution times, it is not clear how to program such a machine to achieve this effect. Thus, there is an unmet need for methods for Kirchhoff-migrating seismic data on parallel machines, and on hypercube machines in particular.

These and other limitations and disadvantages are overcome by the present invention, however, and new economical methods are provided for quickly Kirchhoff-migrating seismic data using parallel machines.

SUMMARY OF THE INVENTION

In a preferred embodiment of the present invention, methods are provided for processing seismic data to Kirchhoff-migrate this data using a parallel machine. Although the methods of the present invention are implemented on a parallel or multiprocessor machine that is interconnected to form a hypercube, the methods of the present invention may also be employed in parallel machines that are not connected as a hypercube.

Kirchhoff migration may be performed on a multiprocessor machine in a variety of ways. The presently preferred method chosen for a parallel machine is to build up one or more migrated output traces in each microprocessor (node) designated as a "migration" processor, as input traces are passed from migration node to migration node along a nearest-neighbor chain of such migration nodes. In the Kirchhoff migration process the main task to be performed is a local interpolation of each input trace for each output subpoint to which it contributes, although there are other tasks. Similarly, other types of seismic processing employ such a local interpolation and may employ the methods of the present invention.

In the preferred method of the present invention, seismic data is brought in from disk or other external storage to an appropriate Input/Output (I/O) processor (input processor) and is then sent to one of a plurality of nodes which are dedicated to "preprocessing" the data (preprocessing involves such functions as format conversion, amplitude normalization, phase shifting, frequency weighting, blanking, summation, and filtering). Preferably, the preprocessor nodes send their outputs to a "gather" node which passes the data to the first migration node in a chain of processors. From there each input trace is sent along a chain of migration nodes for migration into appropriate output locations which are assigned to the nodes.

This method requires the use of P/K migration nodes, where P is the maximum size (width) of the migration operator in output subpoints and K is the number of output traces being produced per node at any time. There may be a plurality of such gather and migration node chains, and when a number, C, of such nearest-neighbor "chains" of the same length are employed, P·C/K migration nodes are required. Alternatively, multiple chains of varying lengths may be employed.

Output traces from the migration nodes are sent to one of a plurality of "postprocessing" nodes (postprocessing involves such functions as format conversion, amplitude normalization, phase shifting, filtering, and summation), each of which in turn sends a final migrated trace to an appropriate I/O processor (output processor) for appropriate storage, such as on disk. One or more "operator" nodes are dedicated to computing velocities, traveltimes, and limits for migration operators, as requested by the migration nodes. If online display is desired, output traces are also processed for display by yet another set of "graphics" nodes. In accordance with the methods of the present invention, the numbers of nodes used for the various tasks and their locations within a hypercube are chosen so as to maximize the throughput of the seismic data.

It is an object of the present invention to provide a method for quickly migrating seismic data on a parallel machine without the need for storing, at the same time, all the seismic data (or a large fraction thereof) in processor memory, and without excessive manipulation of the data.

It is an object of the present invention to provide a method for processing seismic data on a parallel machine.

It is an object of the present invention to provide a method for Kirchhoff migrating seismic data on a hypercube parallel machine.

It is an object of the present invention to provide a method for allocating the locations and numbers of processors performing functions in a hypercube parallel machine for processing seismic data.

It is object of the present invention to provide a method for allocating the locations and numbers of processors performing migration functions in a hypercube parallel machine for migrating seismic data.

These and other objects and advantages of the present invention will become apparent from the following detailed description, wherein reference is made to the figures in the accompanying drawings.

DETAILED DESCRIPTION

In a preferred embodiment of the present invention, methods are provided for processing seismic data to Kirchhoff-migrate this data using a parallel machine. The methods of the present invention preferably use a parallel or multiprocessor machine that is interconnected to form a hypercube. Preferably such a hypercube machine is composed of one host computer, processor, or microprocessor, and 512 nodes, where each node consists of a general-purpose microprocessor with at least about ½ megabyte of local random access memory (RAM), as well as large external data storage facilities. Each node processor is capable of executing at rates of at least about 1.5 MIPS and 0.25 MFLOPS. Preferably, a plurality of separate Input/Output (I/O) processors, each with eight high-speed, full-duplex ports interconnected with the node microprocessors for high-speed I/O is also employed.

Figure 1:
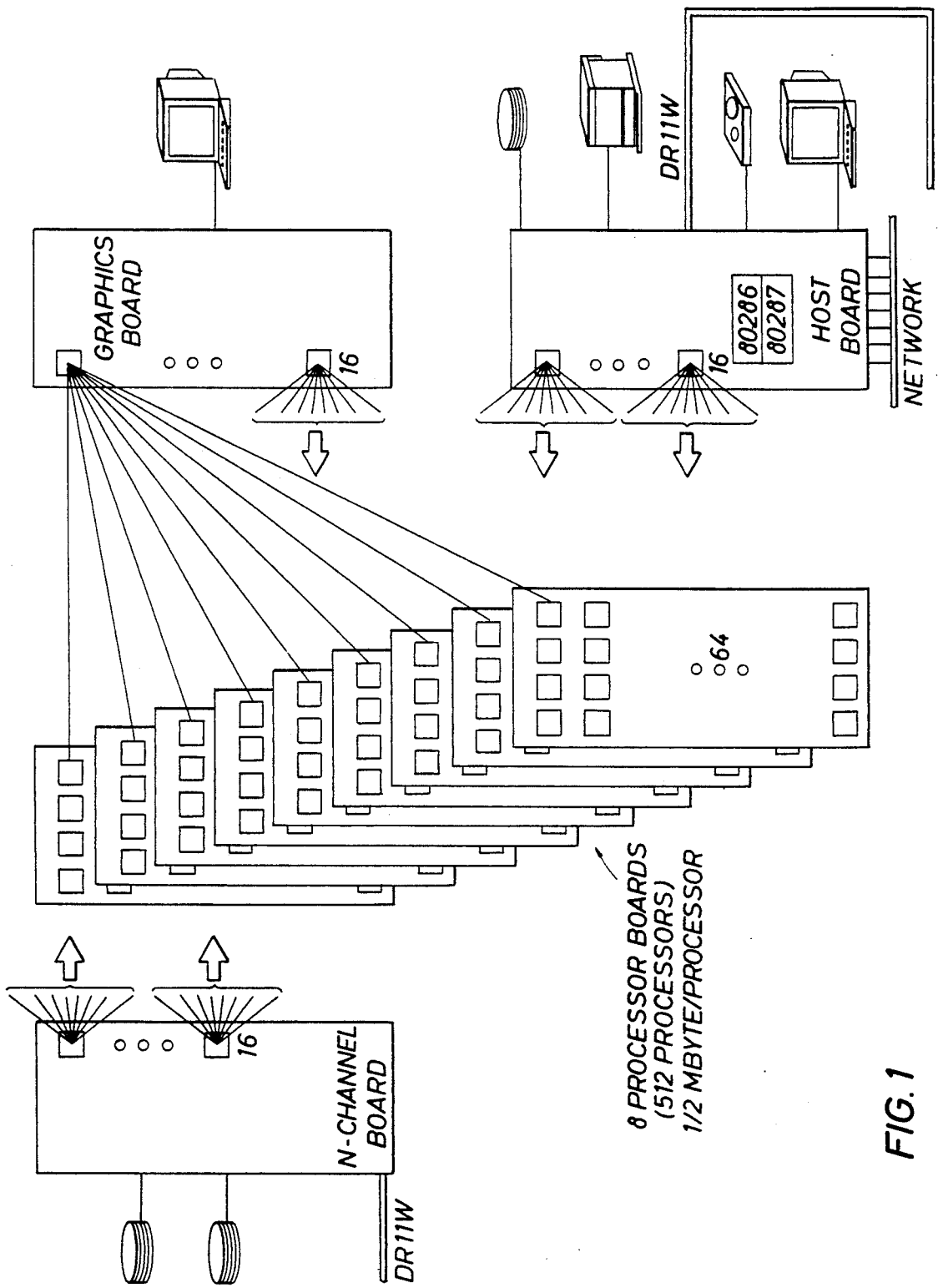
FIG. 1 depicts a simplified, functional diagram of a hypercube machine for performing migration in accordance with the methods of the present invention.

The host processor may be similar to a node processor, or preferably it may be a somewhat faster processor with more memory. It may also have a complement of disk drives and tape drives for storing programs, and it will be interconnected via appropriate connections with a plurality of node processors. Normally, all program control and access to the machine for a user will be through the host processor. However, each node processor preferably maintains its own program control subject to certain control functions dicated by the host processor. Such a hypercube computer is functionally depicted in FIG. 1.

The hypercube interconnection for parallel machines is presently preferred because the diameter of the machine is small; at most ten steps across the hypercube channels (for a 1024-node machine) are needed to move data from any one node to any other node. Also, the hypercube interconnection results in a large internal data bandwidth. If, for example, all nodes simultaneously exchange data with their neighboring nodes along one dimension, the total rate of data movement in a hypercube machine may be very large. The attractiveness of the hypercube interconnection is due in large part to this large internal data bandwidth and this small diameter. This allows a large amount of data stored in the nodes to be thoroughly reshuffled across the machine easily and quickly. One hypercube machine available today is the NCUBE machine manufactured by NCUBE, Inc. of Beaverton, Oregon. However, the methods of the present invention may also be employed in parallel machines that are not interconnected as a hypercube.

Another advantage of the hypercube architecture is its scalability to greater size and speed. The next generation of node microprocessor used in a hypercube machine may run with a floating-point speed of 10 times that of the node microprocessor in hypercube machines available today. If the node-to-node communication bandwidth is increased proportionally, the furture generation hypercube machine could be capable of producing 10 billion floating-point operations per second. At this computational rate, the speed necessary to do 3D "points"-migration in a realistic and timely manner becomes available.

In order to perform computation in parallel on a set of processing nodes of a multiprocessor computer, a program for the execution of a particular task must be broken into pieces (decomposed) and parceled out to the individual processors. Each processor will then perform the calculations to execute its piece of the assigned work. In general, a problem or program may be decomposed into different subprocesses (functions), different spatial coordinates, or different collections of data.

For any particular program to be run efficiently on a parallel machine, all or most processors must be kept busy doing useful work for a large portion of time during any calculation. Without such an ensemble of busy processors, no speedup based upon "parallelism" will result. The program must be decomposed and assigned to the processors in a manner that will avoid message paths that incur high transmission overhead along with the attendant degradation in performance. The objective is to achieve a decomposition of the program and-/or its data and to place the decomposed problem and-/or data onto individual processors in a way to make maximum use of the computational resources of the parallel computer; the computational resources of a parallel computer include computational capability and communication capability.

The problem of "processing" seismic "data" on a parallel machine poses this same general problem of how to decompose the "processing" and/or "data" to take advantage of the parallelism of the machine. In general, seismic data consists of long lines of input traces arranged in a sequence that corresponds to physical locations where the traces are recorded. Most "processing" may be broken into functional pieces with each of the resulting "pieces" (functions) being assigned to one or more parallel processors, depending upon any subsequent decomposition. If the "function" of any such piece does not require any movement of data among other such "function" pieces then that "function" may employ a plurality of processors to decompose the data; then the data may be decomposed over a plurality of processors assigned that "function." For example, multiple processors may bandpass filter assigned input traces in parallel to "speed up" the filtering function. Further, any such piece may be further decomposed into spatial pieces. For example, the "function" of calculating reflected waves may be decomposed into different volumes of the earth.

Some systems, such as those described by partial differential equations, have a natural description and decomposition as a linear, rectangular or volumetric set of grid points when the equation for evolution of the system is discretized for digital computation. In order to achieve efficiency in data transfer between nodes that will occur during the course of the computation, it is desirable to assign the nodes such that a nearest-neighbor grid of the spatial discretization, i.e. natural decomposition, is mapped onto a nearest-neighbor grid of processors in the parallel computer.

Developing a program for use on a hypercube may involve decomposing the data set (data-space) of the problem and distributing the data over the nodes. In order for the whole machine to run efficiently, it is desirable to keep interprocessor communication "cost" at a minimum and to keep the work performed by the processors evenly distributed throughout the course of the entire computation.

For most hypercube computers, the least "expensive" communication is that which occurs between directly connected processors. Thus, it is desirable to decompose the data set such that whenever possible nearest-neighbor communication is the dominant communication pathway. In some programs, a massive exchange of data among the processors is necessary at one or more intermediate result stages during the overall calculation. In such a case, there are known methods for data exchange that make use of the interconnection properties of a hypercube. For such cases, it may also be necessary to decompose one or more such intermediate result data-spaces. In order to minimize communication overhead, the assignment of computational nodes should be accomplished in a way that preserves the locality of data exchange. In order to keep all of the processors busy doing useful work at all times during execution of the program, the work load should be distributed evenly among the processors.

As noted later herein, migration of seismic data according to the methods of the present invention is decomposed based upon a mixture and combination of decompositions. In particular, migration may be decomposed by "functions" into preprocessing tasks, actual migration operations, postprocessing tasks, and migration operator calculations, as well as some other supporting tasks or functions. In turn, postprocessing and preprocessing may be decomposed by data into collections of data. However, the actual migration operations may be decomposed by spatial coordinates (output locations).

Thus, the methods of the present invention allocate the tasks associated with processing seismic data among the processors for a multiprocessor computer. The methods decompose the input data-space, at least one intermediate result data-space, and the output data-space in such a manner that the processing tasks decompose into elementary operations that can locally access the data as required by the data-space decompositions and produce the output as required by the output data-space decomposition. The methods then determine that the processor resource required to perform each processing task, the amount of data required for that task, and data rates are in harmony with the processing and communications capabilities of the processors of such a multiprocessor computer.

Kirchhoff migration can be performed on a multiprocessor machine in a variety of ways. The presently preferred method chosen for a parallel machine, and especially a hypercube machine, is to build up one or more migrated output traces in each microprocessor (node) designated as a "migration" processor or node, as input traces are broadcast to or passed from one migration node to the next migration node in a nearest-neighbor chain of such migration nodes. That is, the locations where output traces are desired (output subpoints) are mapped onto the migration nodes. As an output trace is completed by a node, the node sends that trace to storage (via other nodes) and is then assigned a new output location for which the node is to build up an output trace. In a Kirchhoff migration process the main task to be performed is an independent interpolation of localized values of each input trace for each output subpoint to which it contributes, as noted hereinbefore, although there are other tasks, as noted later herein.

The hypercube interconnection network, and other similarly interconnected processors for other types of parallel machines, allow for several one-to-one mappings of the nodes onto a chain (or loop), for which each pair of adjacent nodes on the chain are nearest neighbors in the hypercube physical interconnection network. One such mapping is easily generated by Gray coding the node number into a position along a chain. This mapping may then be used to determine a chain of nearest-neighbors to be used as migration nodes and to allocate which other nodes perform other tasks associated with migration. Other embodiments of the methods of the present invention may broadcast input data to an appropriate collection of nodes.

Figure 2A:
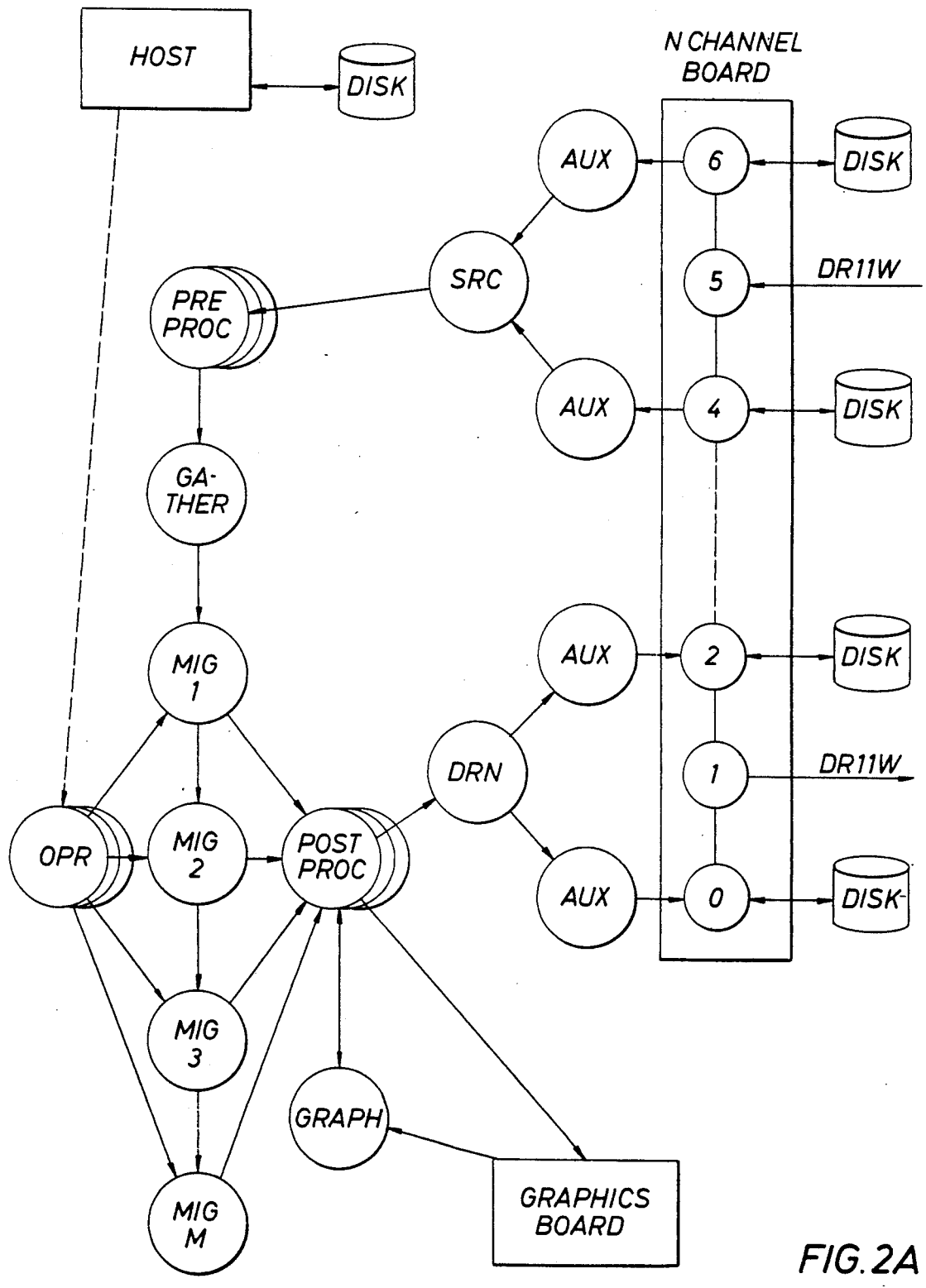
FIG. 2A depicts a preferred, simplified, functional arrangement diagram for the assignment of the nodes and data flow therebetween of a hypercube machine for performing migration in accordance with the methods of the present invention.
Figure 2B:
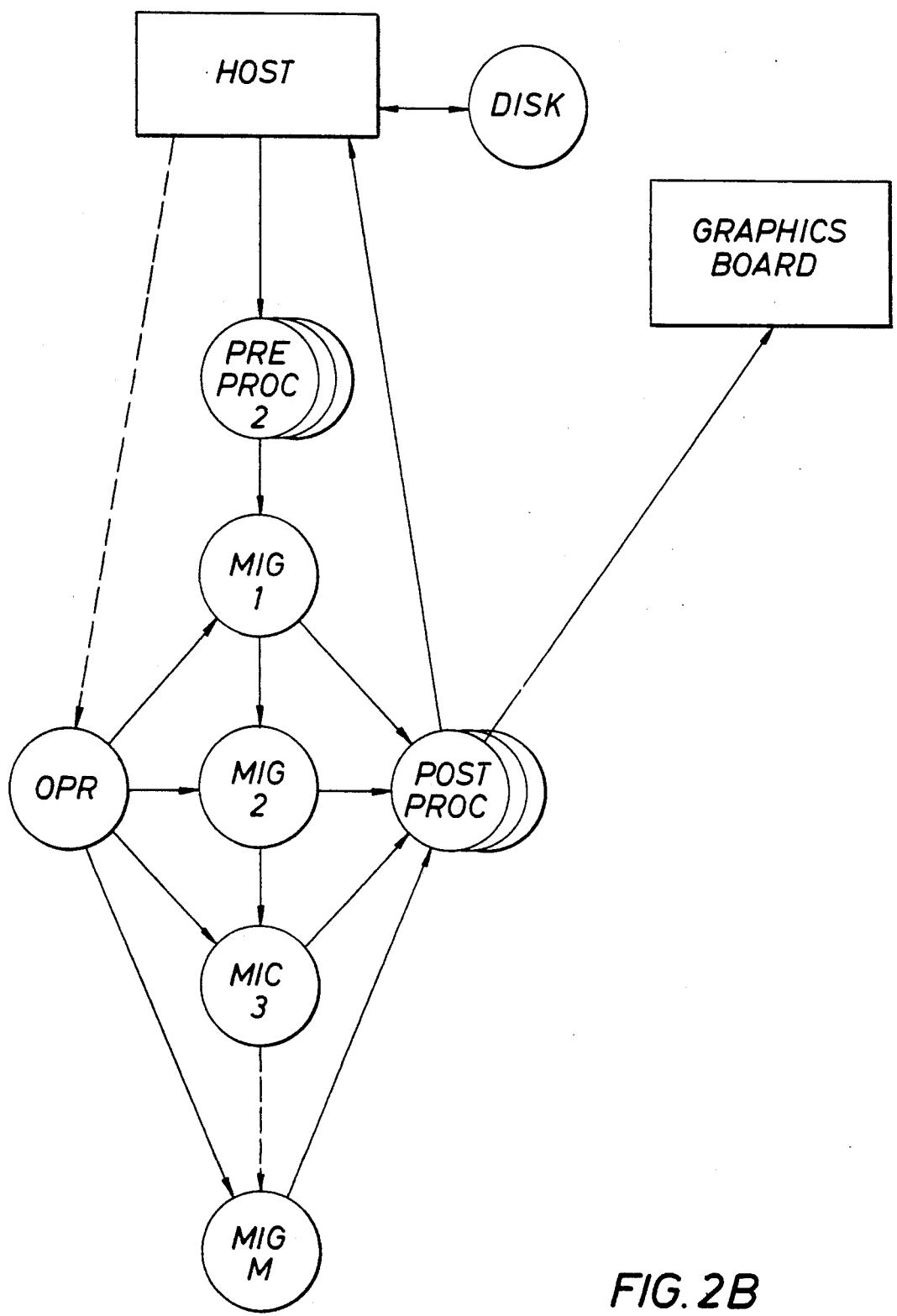
FIG. 2B depicts an alternative, simplified, functional arrangement diagram for the assignment of the nodes and data flow therebetween of a hypercube machine for performing migration in accordance with the methods of the present invention.

Referring now to FIG. 2A, there may be seen a preferred, simplified, functional arrangement diagram for the assignment of nodes and for the flow of data between the nodes of a hypercube to allow for migration of seismic data in accordance with the methods of the present invention. More particularly, there may be seen appropriate I/O processors which are linked via dataflow paths with several preprocessing nodes which are then linked with a gather node which is then linked with the start of a nearest-neighbor chain of migration nodes. FIG. 2B depicts a similar arrangement as in FIG. 2A but does not employ separate I/O processors and instead employs the host processor to perform the I/O functions. The migration nodes are also linked with at least one operator node and a plurality of postprocessor nodes. The postprocessor nodes are in turn linked to appropriate I/O processors; optionally, the postprocessor nodes may be linked to a graphics subsystem as well. There may be intermediate nodes, not shown, on some of the dataflow paths other than the paths of the nearest-neighbor chain. The method of the present invention for allocating which and how many nodes perform what tasks is discussed later herein. A method for utilizing multiple nearest-neighbor chains is also discussed later herein.

More particularly, seismic data in subpoint order is brought in from disk or other external storage by an appropriate I/O processor (herein called a "source" [abbreviated "SRC" in FIG. 2A] or input processor), which for some parallel machine configurations may be the host. This seismic data may be actual field data or synthetic data. The data is then sent by the I/O processor to one of the nodes which are dedicated to preprocessing activities. Preprocessing activities are functions such as format conversion, amplitude normalization, phase shifting, frequency weighting, blanking, summation, and filtering for each input trace. The preprocessor nodes send each preprocessed input trace to one gather node which serves to put the preprocessed input traces back into a linear sequence (by subpoint). Although gather nodes are not required, they are preferably used to improve the efficiency of data transfer. From the gather node, each input trace is individually sent along a chain of migration nodes for migration. For broadcast embodiments such a chain may not be required. Once an input trace is used and forwarded by a migration node, that node discards the forwarded input trace, making room for more data.

Within a migration node, each output trace assigned thereto and being produced is built up by the contributions of the various input traces that fall within the input trace width of the operator for that output trace. When the last input trace within a particular operator width has been processed, the corresponding output trace is complete and is then transferred to one of a plurality of postprocessing nodes, and the migration node then selects a new output subpoint for production of a new output trace. Selection of a new output subpoint may be based upon a predetermined formula (such as output subpoints spaced 1/K times the operator width apart, as noted later herein), the next unassigned subpoint in a sequence of subpoints, or other appropriate techniques. Thus, the assignment of output subpoints to nodes is on a temporary basis, i.e. until an output is completed when a new assignment of output subpoint is made. Assignment of a new output subpoint includes obtaining, from an operator node, the necessary velocity/traveltime and operator data for the new output location. If a migration node has sufficient available memory, it may "anticipate" the new output location and have requested the necessary operator data ahead of time. Thus, the methods of the present invention independently process each input trace into many output traces.

The postprocessing nodes perform such functions as format conversion, amplitude normalization, phase shifting, summation, blanking, and filtering. After postprocessing, the final migrated output trace may also be sent on to a graphics subsystem for display and/or to one of a plurality of I/O processors (herein called a "drain" [abbreviated "DRN" in FIG. 2A] or output processor) for storage on tape or disk or for shipment to another computer.

Each of the plurality of operator nodes is dedicated to providing velocities and/or traveltimes, as well as computing the limits for the migration operator, as requested by the migration nodes. These operator nodes calculate this information from the velocity and other data provided as inputs to the host computer along with the request for migration of a set of seismic data. A graphic subsystem allows an output trace to be displayed, as soon as it is completed, on an appropriate CRT screen interconnected with the graphics subsystem. The numbers of nodes used for the various tasks and their locations within the hypercube are chosen, as described later herein, so as to maximize the throughput of the seismic data.

Although the previous discussions herein have been, in general, about Kirchhoff migration, the methods of the present invention may also be employed to process seismic data in a manner to independently process each input via an interpolation of localized input values to calculate contributions to selected output locations. Such processing may be Kirchhoff-like processing which employs frequency or other weighting techniques or may be non-Kirchhoff processing (not employing frequency weighting).

Thus, it may be seen that the methods of the present invention for processing, or Kirchhoff migrating, seismic data map or assign a collection or sequence of output locations spanning an operator width, which may or may not be zero, to a corresponding collection or sequence of preferably nearest-neighbor processing, or migration, nodes and then a collection or sequence of input traces is provided to or passed down such a sequence of processing, or migration, nodes to determine processed, or migrated, traces for their assigned output locations.

However, in order to avoid the necessity of having to pass the input traces through the migration node sequence more than once for a given set of seismic data, there must be a sufficient number of output locations assigned to each of the available number of migration nodes to span the width (in output subpoints) of the maximum size migration operator. Alternatively, if there are a large number of available migration nodes, and only one output location is assigned to each node then there must be a sufficient number of migration nodes to span the width (in output subpoints) of the maximum migration operator. That is, a migration chain should contain at least an operator width of output locations.

Each migration node may produce more than one output trace at a time. To avoid "reading" or storing all input traces more than once (i.e., excessive data manipulation), an entire operator-width of output traces (i.e. a "window" of output traces) must be under production in the migration nodes of the chain at any time. That is, all the output traces that correspond to the width of the migration operator (the "window") must be being generated in the migration nodes of the chain at any time, i.e. an input trace need be read only once since once an input trace is in the machine, all the output traces to which it should contribute are being generated in the chain. This means that there is essentially no limit to the length of seismic line that can be migrated by the methods of the present invention. However, it is usually not advantageous to have more than that number under production at a time because any "extra" migration nodes would be idle from time to time. This is the link between migration operator size and machine size (i.e., the number of nodes available to be migration nodes and migration operator size).

The time it takes for a node to perform "migration" for an input trace can vary considerably; it is particularly dependent upon the distance between the locations on the surface of the earth of the input and output traces. If the distance is small, much of the input trace can contribute to the output trace, and thus the amount of computation is relatively large. If the distance is large, say, near the left or right limit of the operator, then only a small portion of the input may contribute, and the amount of computation is relatively small. If only one output trace per node is being produced at a time in the chain, then in some portions of a nearest-neighbor migration chain, the input trace may be close to the output trace, while in other parts of the chain the distance may be large. Thus, some nodes may have to wait at times so that others can catch up, in spite of any multiple buffering of input and output traces to smooth out such variations.

However, this situation can be avoided to a large extent if more than one output trace is assigned to and produced at a time in the migration nodes, and if these output traces are properly chosen. Assume for simplicity that the number of output traces per node, K, exactly divides the operator width, P. Then the chain is of length L=P/K (not including the gather node). For workload balance, the first node in the chain is assigned and begins producing output traces 1, L+1, . . . , and (K−1)*L+1. The second node in the chain is assigned and begins producing output traces 2, L+2, . . . , and (K−1)*L+2. The last node in the chain, Node L, is assigned and begins producing output traces L, 2L, . . . , K*L. As output trace 1 is completed, it is sent to a postprocessor, and then the first node is reassigned a new output location K*L+1 and begins producing output trace K*L+1. This reassignment process continues until the output line is completed. Notice that the output traces assigned to a node are 1/K times the operator width apart. This implies that the amount of computation time in migrating an input trace to the currently assigned output traces of a node will vary much less from one migration node to another (as opposed to the case of a single output trace per node), and hence that the idle time previously noted should be greatly reduced. This multiple output trace per migration node balances the workload over the migration chain.

Figure 3:
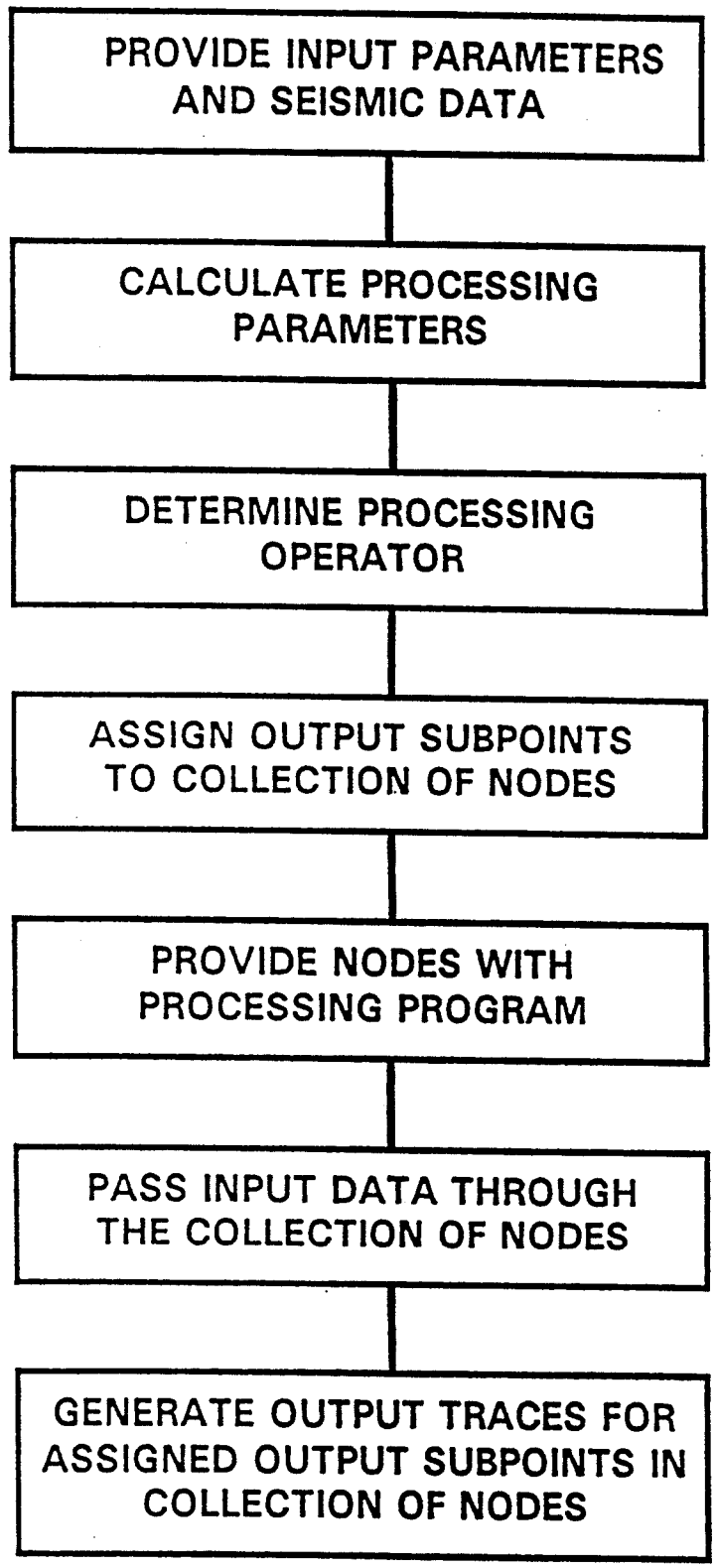
FIG. 3 depicts a simplified flow diagram of a method of the present invention for processing seismic data.

Referring now to FIG. 3, there may be seen a simplified flow chart of a method of the present invention for processing seismic data. The method for processing seismic data on a multiprocessor computer having multiply interconnected processor nodes provides such a computer with appropriate input parameters (acquisition geometry, velocity information, desired output locations, etc.) and seismic data, and then calculates processing parameters from some of the input parameters. The method next determines a processing operator and its maximum size from some of the input parameters and arranges a correspondence between a collection of the nodes and preselected output subpoints such that one or more output subpoints are assigned to one node and such that the output subpoint span of the maximum-sized processing operator is less than the output subpoint span assigned to the collection of nodes. The methods provide such nodes with a processing program and processing parameters and then passes the seismic data as a linear sequence of input traces through the collection of nodes in a continuous sequence, and for each node of the collection of nodes and for each corresponding output subpoint assigned thereto generates an output trace for the corresponding output subpoint from those input traces whose subpoints fall within the input subpoint span of the processing operator corresponding to said corresponding output subpoint.

In some cases it may not be feasible to choose the output traces in this manner. When externally computed traveltime data is used, for example, the output traces assigned to a node may have to be chosen to be consecutive traces to reduce the storage requirements for traveltimes.

The allocation of nodes is one of the major tasks in programming a multiprocessor machine. By allocation is meant deciding which physical node does which task, operation, or function, as well as how many nodes are used for each task, operation, or function. In addition, some schemes may require reallocation of some or all nodes during a run.

The allocation task may be quite simple or extremely complex, yet it can have a large influence on the speed of execution of a program. This is particularly true in the case of seismic data processing because of the relatively large amount of I/O inherent in processing seismic data. Thus, it is imperative that the hypercube or parallel seismic programmer have a thorough knowledge of the capabilities and facilities of the multiprocessor machine, and that node allocation be done with some care.

Proper allocation of nodes is important for maximizing throughput of seismic data. As stated hereinbefore, the migration nodes are preferably mapped onto a nearest-neighbor chain of nodes. The number of migration nodes, M, and the number of output traces being generated at a given time by a migration node, K, should be chosen such that $M * K \geq P$, where P is the maximum operator width in output subpoints. This will assure that, in one pass through the chain of migration nodes, an input trace will be migrated into all the output traces to which it contributes. This avoids excessive manipulation of the input traces, such as reading the input traces more than once from external storage or having to utilize temporary external storage for input traces. However, there is little advantage in choosing M and K such that M * K greatly exceeds P, since in such a case an input trace often contributes to fewer than K output traces in a migration node and thus that node will be idle from time to time.

The number of nodes to be used as preprocessors is chosen to be large enough so that the input traces are preprocessed as fast as the migration chain may migrate them. For example, if the ratio of preprocessing time per input trace to migration time per input/output trace pair is R, then the number of preprocessing nodes, E, should be chosen so that $E \geq R/K$, where K, as hereinbefore defined, is the number of output traces per migration node. A typical value for R is 18. Thus, the preprocessing time per trace for Kirchhoff migration is about eighteen times the migration time for one trace.

In a similar manner, the number of postprocessor nodes is chosen such that the output traces may be postprocessed as fast as they are generated by the migration nodes. For Kirchhoff migration the postprocessing time per trace is faster than the preprocessing time. Similarly, the number of operator nodes should be chosen to provide operator data to migration nodes in a manner to support the migration chain.

Figure 4:
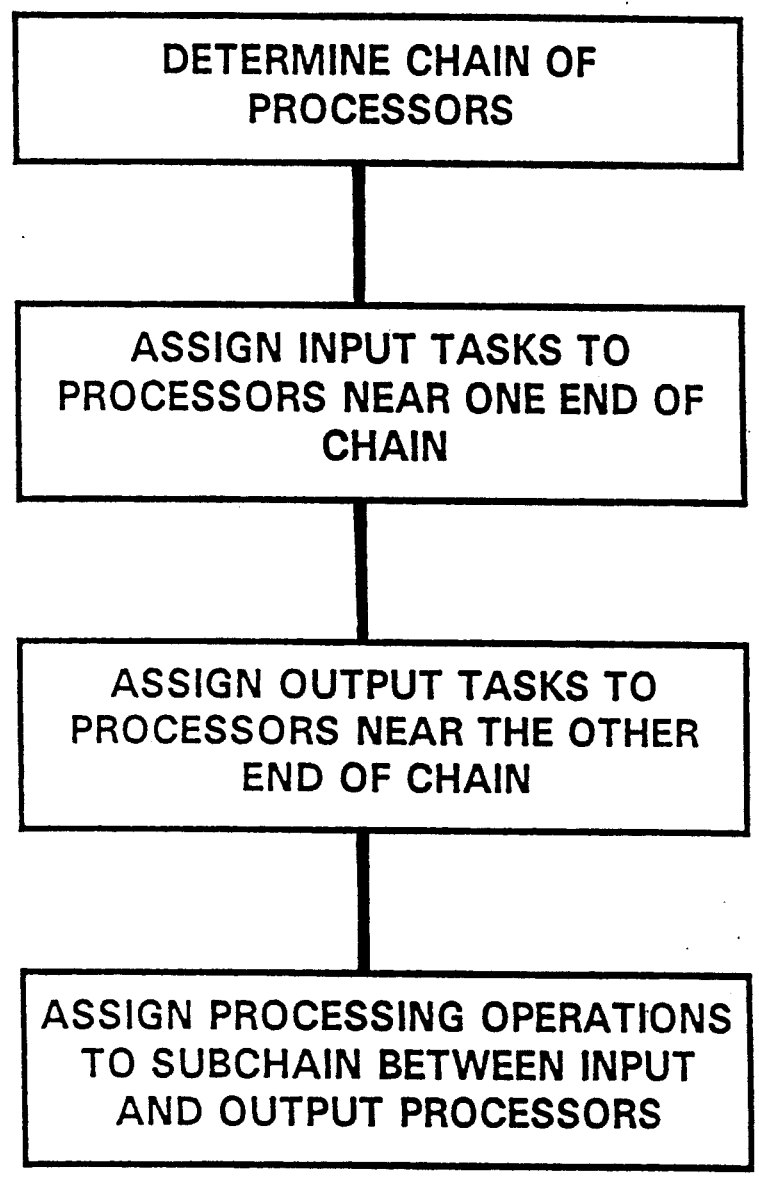
FIG. 4 depicts a simplified flow diagram of a method of the present invention for allocating tasks among processors.

Referring now to FIG. 4, there may be seen a simplified flow chart of a method of the present invention for allocating tasks among the processors of a multiprocessor computer. The method for allocating tasks associated with migration and migration operations among the processors of a multiprocessor computer determines a nearest-neighbor chain of all the processors, assigns input tasks to an appropriate number of processors near one end of the chain and assigns output tasks to an appropriate number of processors near the other end of the chain. The method then assigns migration operations to at least one nearest-neighbor subchain of a preselected number of processors between the assigned input task processors and the assigned output task processors.

Finally, the actual assigning of tasks or functions to the appropriate number of physical nodes may be important, depending on the type of message passing in the target multiprocessor. In a hypercube machine, for example, the input data sent from the preprocessing nodes may go through migration nodes on the way to the gather node. However, this extra communications burden on the migration nodes can usually be ameliorated by judicious task or function placement among the nodes. For the NCUBE machine it is accomplished by choosing the preprocessor nodes to be "lower" on the nearest-neighbor Gray code chain than the gather and migration nodes.

In a hypercube architecture, such as an NCUBE, a message, in going from a source node to some destination node, will travel through I intermediate nodes, where I varies from 0 to $N-1$, and N is the order of the hypercube (a hypercube of order N has $2^N$ nodes). Nodes are said to be "nearest neighbors" if I is 0. A chain of nearest neighbors, snaking through all of the nodes in a hypercube, can be obtained by use of a Gray code; extensive use of this is made in the method of the present invention. Proper allocation of nodes in many cases can significantly reduce message transit time by reducing the number of intermediate nodes where message traffic is heavy.

Figure 5:
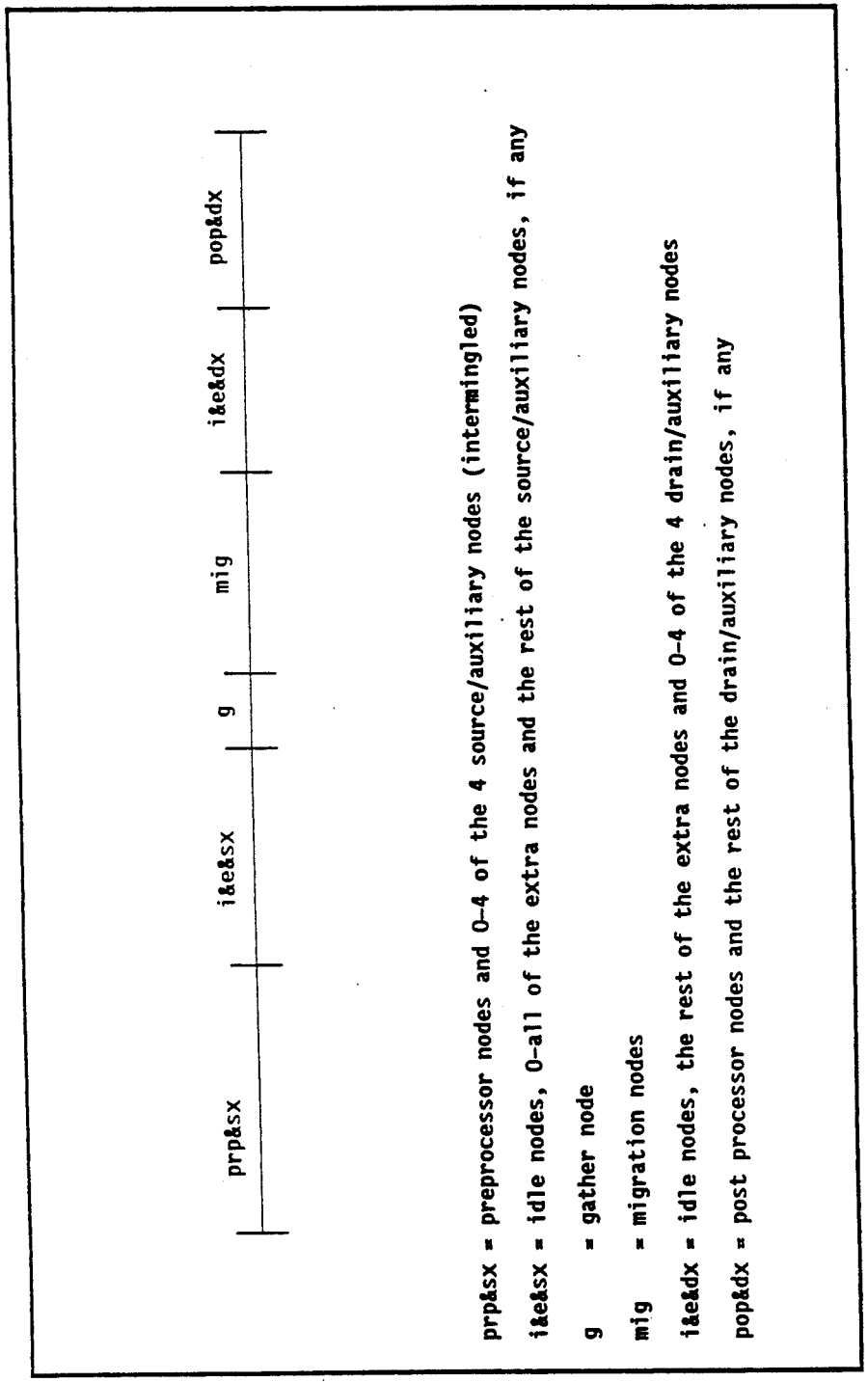
FIG. 5 depicts a diagram showing a general node allocation for Kirchhoff migration according to the methods of the present invention.

FIG. 5 is a diagram showing a node allocation for Kirchhoff migration according to the methods of the present invention. The nodes are allocated according to their positions along a Gray code generated nearest-neighbor chain rather than their actual node numbers. The Gray code is generated from the node number (determined as noted herein) in binary notation and compares the node number and node number divided by 2 (on a bit-by-bit basis) with an "exclusive or" to generate the Gray code chain. The Gray code is a way to map the node numbers onto a nearest-neighbor chain of nodes. This is done primarily because most of the nodes are migration nodes which use this nearest-neighbor access for efficiency of data transfer. FIG. 5 is not to scale; the migration nodes usually comprise a much larger percentage of the total than the Figure would indicate. For example, a typical run for 512 nodes may have the following number of nodes assigned: source (4); preprocessor (30); gather (1); migration (410); operator (8); postprocessor (15); drain (4); and idle (30). The methods of the present invention for node allocation are described in more detail, hereinbelow.

The methods of the present invention make extensive use of the Gray code in its node allocation scheme. The main purpose is to obtain a chain of nodes which are nearest neighbors, i.e., so a trace (which may be an input trace or an output trace) can be passed from node to node along the chain and each pass is from neighbor to neighbor, with no intermediate nodes. But when traces are passed from source node to preprocessor, from preprocessor to gather node, from migration node to postprocessor node, and from postprocessor to drain node, it is not possible to always have nearest-neighbor passes. So in the node allocation methods of the present invention, the methods attempt to "position" the various nodes (i.e., position the functions assigned to the nodes) so that the above message passing has the least impact on the processing or migration (busiest) nodes. A brute-force search through all possible node configurations could be quite costly, but the following theorem greatly reduces the cost by eliminating whole classes of message paths from the search. It should be noted that this theorem depends on the specific message-passing procedure used in an NCUBE computer; in general, it does not hold for all hypercubes or other parallel machines. However, analogous theorems for any particular parallel computer can be established based upon the particular message-passing procedure employed by that parallel computer.

In summary, the theorem is as follows: If a message is sent node-to-node on NCUBE, and the receiving node is farther along the Gray-code chain than the sending node, then none of the intermediate nodes on the message path will be past the receiving node; likewise, if the receiving node is earlier on the chain, none of the nodes on the message path will be earlier than the receiving node. However, there are often message path nodes earlier than the sending node in the first case, and later than the sending node in the latter case.

The above theorem has important implications. For example, it means that if preprocessor nodes are selected "lower" on the Gray-code chain than the gather node (the gather node is the chain predecessor of the first migration node), then none of the messages from preprocessor to gather node will go through any migration node.

The details of the node allocation methods of the present invention are as follows:

1. Given the generated Gray-code chain, initially determine the numbers and locations of source, drain, and auxiliary (input/output) nodes, if any. This is done first because it is preferred to have any auxiliary (input/output) nodes be nearest-neighbors to their respective NChannel nodes on the NCube NChannel I/O board. The source and its auxiliaries (input nodes) are placed at the lower "input" end of the Gray-code chain and the drain and its auxiliaries (output nodes) are placed at the high "output" end of the chain. This restricts the amount of the Gray-code chain available for use as migration nodes, namely to be between the highest source/auxiliary node and the lowest drain/auxiliary node. There are ways to extend the migration chain beyond these limits, by allowing deviations from the Gray-code chain at some points in the migration chain (but this complicates the bookkeeping for each node's program).

2. Within the limitations of the minimum numbers for the various types of node, as noted hereinbefore, and within the chain limitation of Step 1, choose the smallest possible number of output traces per node, K. Specifically, K is determined as the smallest integer which satisfies the integer inequality:

$$P/K + 1 \leq NCHAIN,$$

where P is the number of output subpoints in the largest operator (maximum size operator), NCHAIN is the length of the restricted chain, and the '+1' allows for the gather node. This step determines the number of nodes to be assigned as migration nodes.

3. The number of migration nodes resulting from the choice of K in Step 2 rarely equals NCHAIN, so the gather/migration chain may be located anywhere within the available chain of nodes in order to minimize the amount of non-migration operations communications traffic through the migration nodes. The theorem noted above aids greatly in the search for such a location (or locations) within the chain of available nodes.

4. Avoiding the specified migration chain and within the minimum number of types of nodes limits, choose the numbers of preprocessors and postprocessors; in the case of limited resources, these numbers are chosen in relation to how much CPU time their respective tasks require, as noted hereinbefore. This step determines the numbers of nodes needed for performing preprocessing tasks and postprocessing tasks.

5. Assign any nodes left over as extra operator nodes, as needed or permitted.

6. Fix the locations of the nodes whose places have not been previously fixed. More particularly, preprocessors may be assigned to any previously unassigned node, starting at the beginning of the Gray-code chain (node 0) and working upwards. The desired limitations are that no preprocessor will be "above" the gather node in the Gray-code chain. Postprocessor nodes are similarly placed at the "end" of the chain; they will all be located "past" the last migration node. Next any "graphics" node, used if completed seismic data is displayed on a graphics subsystem, is preferably assigned just below the postprocessor nodes to take advantage of the "nearness" to the output traces as they are completed in the migration nodes and are provided to the postprocessor nodes. Next, the operator nodes are likewise placed just below any graphics node, if any, or the postprocessor nodes. Finally, any other types of nodes are placed below the operator nodes. The previous chain position limitations do not apply to the latter three types of nodes (operator, graphics, and "any other types"); some of the nodes of these three types may be assigned below the gather node if all the nodes beyond the migration nodes have been allocated.

7. In rare cases, the choice in Step 2 may take up nearly all of the available chain and result in a low number of nodes available as preprocessors and/or postprocessors; such low numbers would then be overburdened. In such a case, Steps 3-6 are repeated with the next-largest value of K. Then the better of the two cases (the one which best maximizes throughput) is chosen as the node allocation to be used.

Thus, in summary, the present invention provides a method for allocating tasks associated with migration and migration operations among the processors of a multiprocessor computer. This method determines a nearest-neighbor chain of all the processors, assigns input tasks to processors near one end of the chain and assigns output tasks to processors near the other end of the chain. The method then assigns migration operations to at least one nearest-neighbor subchain of a preselected number of processors between the assigned input task processors and the assigned output task processors. The method also may assign input-supporting tasks to processors between the end of the subchain nearest said input processors and the input end of the chain and assign output-supporting tasks to processors between the end of the subchain nearest said output processors and the output end of the chain. The method may also assign other supporting tasks to processors not assigned any tasks or migration operations. However, the method ensures that the number of processors assigned to each task is sufficient to support the operation of the at least one migration subchain.

The method for allocating the tasks associated with processing seismic data among the processors of multiprocessor may also be described as distributing workload to one or more collections, or subcollections, of processors such that each collection's, or subcollection's, computational load is approximately in accord with its internal and external communications capabilities.

To evaluate the performance of the methods of the present invention, a Kirchhoff migration program was developed for a 512 node NCUBE computer. Performance of any computer and program is judged basically by two factors, output quality and speed. The two Kirchhoff migration programs (a single processor program run on a mainframe and a Kirchhoff migration program of the present invention run on a 512 node NCUBE machine) produce essentially the same output for a given data set.

To measure the speed of migration on an NCUBE machine, a Kirchhoff migration program was run under varying node availability conditions with a "standard" data set. The data set, migration program and the migration runstream have the following characteristics: stacked data, 3 ms sampling rate, 2400 samples per trace, 1467 input traces, maximum operator 817 traces wide, and 1468 output traces. Runtimes on NCUBE, Cray and Unisys systems for this data set are shown below in Table 1.

TABLE 1

| | Comparison of Runtimes (# of Nodes) | | | | |
|---|---|---|---|---|---|
| | NCUBE | | | CRAY | UNISYS |
| | (512) | (256) | (128) | (X/MP-14) | (1190) |
| Actual runtime (minutes) | 5.12 | 8.22 | 19.42 | 12.00 | 60.00 |

The Cray and Unisys results were for their respective Kirchhoff migration program, which are algorithmicly similar to the NCUBE program.

Table 1 shows that for this data set, a 256-node NCUBE does somewhat better than the Cray, and that the 512-node NCUBE is more than twice as fast as the Cray. However, a Kirchhoff migration program written in accordance with the methods of the present invention may be used with multiprocessor machines which have many more nodes than 512. Thus, in general, programs written for a certain number of nodes "scales" up to a larger number of nodes.

In the above description of Kirchhoff migration for multiprocessors, there was assumed to be only a single chain of migration nodes. As an alternative, multiple chains with possibly varying numbers of migration nodes may be used, so long as each chain contains a full operator width of output locations. The main purpose of using multiple chains is better utilization of the number of available nodes.

Thus, the methods of the present invention provide a method for allocating the tasks associated with processing seismic data among the processors of multiprocessor. This method distributes workload to one or more collections, or subcollections, of processors such that each collection's, or subcollection's, computational load is approximately in accord with its internal and external communications capabilities.

To take advantage of the case where more nodes are available than an operator size, more than one gather/migration chain of nodes may be formed; again, each chain must contain a full operator width of output locations. The input seismic data would be passed in round-robin fashion to the beginning (gather) node of each chain, and migration would proceed as noted hereinbefore; however, for the multi-chain implementation, a final output trace would be formed by a postprocessor node through the addition of, for each output subpoint, the corresponding N output traces from the N chains. However, in order to effectively utilize this multiple-chains strategy, appropriate I/O rates between nodes must be available.

The number of nodes for many commercially available multiprocessors, particularly the hypercubes, is a power of 2. The number of nodes needed for Kirchhoff migration as described above with a single migration chain is $P/K+X$, where P is the operator width in traces, K is an integer (the number of output traces produced at one time in one migration node) which can be chosen within certain limits dictated by processor memory size, and X is the number of other necessary nodes, including preprocessing and postprocessing nodes. The P/K term is usually much larger than the X term. This implies that a lot of nodes will be unused in some situations. For example, if there are 512 nodes in a multiprocessor, and P is 600, and X is 62, then the best choice for K is 2, and this leaves 150 nodes idle. If, instead, the example's multiprocessor had 4096 nodes, then K would be 1 and there would be 3434 nodes idle. However, the use of multiple migration chains can reduce the number of idle nodes in both these cases.

In the case of multiple chains, each chain produces the same set of output traces that a single chain would (i.e., spans an operator width of output locations), but a given input trace is migrated by only one chain and the input traces are provided to the various chains so that the load is balanced across chains. To produce a final migrated (output) trace, the corresponding (partially) migrated traces from the various chains are added, preferably in a postprocessor node or nodes.

The utility of multiple chains can be demonstrated for the two examples noted hereinabove. For simplicity, gather nodes are ignored; usually, each chain would be composed of a gather node followed by a chain of migration nodes. Also, for simplicity, the number of other necessary nodes, X, is assumed fixed. Consider first the case noted hereinabove with a 512-node multiprocessor, where X is 62. Instead of a single chain of 300 nodes producing 2 output traces at a time, two chains of 200 nodes each could be used, with each migration node producing 3 output traces at a time. Thus, only 50 nodes would be idle. The input data would be sent to the beginning nodes of the two chains in round-robin fashion, and the corresponding output traces from the two chains would be added in a postprocessor to form the complete output. Alternatively, three chains of 150 nodes each could be used, with each migration node producing 4 output traces at one time. Then there would be no idle nodes. Again, the input data would be sent in a round-robin fashion.

For the other example noted hereinabove, the multiprocessor has 4096 nodes. Instead of a single chain of 600 migration nodes, six chains of 600 each could be used; this would leave 434 nodes idle. In addition to these six chains, a chain of 300, with 2 output traces per node at a time, could be used; then only 134 nodes would be idle. Since the time step (the time it takes a node to migrate an input trace to the output traces being generated in that node) of the longer chain is about half that of the shorter one, the input traces for the longer chain would have to be supplied at twice the rate of that for the shorter chain. In other words, each longer chain would be supplied from the preprocessor nodes with 2 of every 13 input traces, and the shorter chain would get 1 of every 13 traces. As noted before, each input trace goes to one and only one chain, and a postprocessor node combines the outputs of the chains.

There are still 134 idle nodes in the last example. So a chain of 120 nodes could be added, each node of which produces 5 output traces at a time. This would leave only 14 nodes idle. For balance of workload, the 600-node chains would each get 10/67 of the input traces, the 300-node chain would get 5/67, and the 120-node chain 2/67.

Obviously, other such combinations of chains and chain lengths are possible. The use of two chains producing 2 output traces per node in place of each chain which produces only 1 output trace per node is, in general, possible. This is for load-balancing considerations, as previously discussed.

However, making use of such multiple chains adds complexity to the programs running on the nodes and adds internal I/O. More than one chain has to be supplied with input traces, and the data paths taken to get to each chain should be considered. Also, the traffic of (now partially complete) output traces from migration nodes to postprocessors is considerably increased. The operator nodes have to send out several times as much traveltime/velocity/operator information; they do the same amount of internal computation, but the computed data must be sent to each of the chains. These factors may have to be taken into consideration in the choice of numbers and lengths of chains and of their positioning among the nodes of the multiprocessor. The main difficulty in the use of multiple chains is one which has to be faced by any scheme in scaling to more parallelism, namely I/O rates.

As described above, Kirchhoff migration can be done efficiently on a multiprocessor by building output traces in the nodes as the input traces are broadcast to or passed along a linear chain of these nodes. For reference, this scheme is called the Input-Move (I-Move) scheme. There are several other ways a chain of nodes can be used to efficiently do Kirchhoff migration.

One such alternative way, which will be called the Output-Move (O-Move) scheme, is to hold the input traces in the nodes, and instead move the output traces and associated velocity/traveltime data along the chain. More specifically, one or more input traces are held in each node while the output traces are passed from node to node along the chain and, in each node, the output trace is updated by the contributions of the input traces held in that node. Enough input traces are held in each node so that the chain of nodes holds an operator-width of the input traces.

In this way, an output trace is complete upon reaching the end of the chain, or upon having used all appropriate input data, and can then be sent on for postprocessing and storage. When an input trace has made all its contributions, it is discarded and a new input trace takes its place. Thus, as with the previous scheme, this scheme admits any length of seismic line. If enough nodes with enough memory are available then more than one chain can be used, with the corresponding output traces from each chain being summed to produce each final output trace. As with multiple chains in the I-Move scheme, an input trace is migrated in only one of the chains, and each chain produces (partially migrated) output traces for all output locations. However, avoiding excessive manipulation of the data in this case implies that the totality of migration nodes in all chains must be able to hold an operator-width of input data.

Another alternative scheme is to broadcast or pass both input and output traces, but in opposite directions. This is called the Input/Output-Move (I/O-Move) scheme. The input is passed in one direction along the chain for one or more steps; then the output and velocity/traveltime data are passed in the opposite direction for one or more steps. As with the schemes discussed previously, more than one chain can be used if enough nodes are available.

All these methods employ relative "movement" between an input data "stream" and an output data "stream." In some cases a "stream" is mapped onto the nearest-neighbor chain. Thus, the methods of the present invention provide for processing seismic data with a multiprocessor computer. Such methods provide input seismic data and output locations to a sequence of processors to provide coordinated relative movement between the input data and output locations, generate output data in the processors such that the contributions of the inputs to any output will occur within the sequence of processors so that all inputs that should contribute to an output have done so before either exits the sequence of processors.

The previous discussion herein was limited to 2D migration. This discussion includes prestack ("points") migration as well as post-stack migration. In the following discussion, methods for 3D Kirchhoff migration are discussed. This discussion includes perstack ("points") migration as well as post-stack migration. A well-known method of approximating 3D migration (called "D2D") is to perform 2D migration on seismic lines in one surface direction, and then perform 2D migration in the surface direction perpendicular to the results of the first migration. This process consists of 2D migration and sorting of traces from one direction into another. There are a number of well-known seismic sorting algorithms for local-memory multiprocessors, especially hypercubes, so this form of 3D migration can easily be accomplished with any of the previously discussed 2D migration schemes. This method is especially suited for 3D marine seismic data sets, which typically consist of a number of fairly parallel seismic lines. From the viewpoint of the 2D migration method, these lines (or a sort of the data into crosslines) can be considered to comprise one long seismic line, with a large gap of at least the operator-width between the component lines. For each of the 2D migration passes, the input is then read in, line after line, and there is no "flushing" out of the migration chain until the last line is migrated. Velocity or traveltimes can be specified in the usual 2D-way, line by line, or modification can be made to accept 3D velocity or traveltime data.

In full 3D Kirchhoff migration, the operator is three-dimensional and so the number of output traces within the maximum operator increases by two orders of magnitude from its value in 2D migration, from perhaps 600 to 90,000 traces for poststack migration. This requires many nodes and large memory in each node to meet the requirement of holding at least an operator-width of output data in the nodes. And, even if this requirement is met, rereading of input seismic data or temporary storage and retrieval of partial output seismic data is required if the amounts of seismic input and output data are large enough (recall that the 2D methods admit input and output seismic data lines of any length).

In some cases only a small amount of output (migrated) data is desired. There are a variety of reasons for this, including the reduction of computation costs. If the amount of output data is sufficiently small, then the I-Move method can be used, even though this method may be inappropriate for use with a larger amount of output data.

In the I-Move method, the nodes in each migration chain normally must hold in aggregate at least an operator-width of output data. However, if the operator width ('n output traces) is greater than the number of output traces to be generated, then the migration nodes are required to hold only the latter. This is generally not of importance for 2D data, but can be significant for 3D data.

As stated above, the 3D operator may contain tens of thousands of traces; the desired 3D migrated output may be much smaller, say, one or more seismic lines or a small output volume. If the output can be held in the migration nodes, then, even though an operator-width worth of data cannot be held in the nodes, the I-Move method can be used and the input data is read only once.

The multiprocessor methods discussed hereinbefore were designed to perform Kirchhoff migration. They can also be adapted for procedures which are, or which have subprocedures which are, similar to Kirchhoff migration, notably the seismic processing procedures known as Kirchhoff redatuming, and 2D and 3D time-domain Dip Moveout (DMO). These procedures employ "shorter" operators and may require multiple chains, and in addition the input data may be passed down the chains by offset rather than by subpoints.

In general, these Kirchhoff-type seismic processing methods, as well as other seismic processing methods, employ an independent local interpolation of each input trace for each output subpoint to which it contributes. Kirchhoff-type processing also employs a preprocessing step of frequency weighting (or any of its equivalents) that these other types of seismic processing methods may not employ.

Many other variations and modifications may be made in the techniques hereinbefore described, by those having experience in this technology, without departing from the concepts of the present invention. Accordingly, it should be clearly understood that the methods depicted in the accompanying drawings and referred to in the foregoing description are illustrative only and are not intended as limitations on the scope of the present invention.

What is claimed is:

1. A method for processing seismic data on a multiprocessor computer having multiple interconnected processor nodes, comprising:

providing such a computer with appropriate input parameters and seismic data;

calculating processing parameters from some of said input parameters, said processing parameters including an output subpoint span;

determining processing operators and a maximum size processing operator from some of said input parameters;

arranging a correspondence between a collection of said nodes and preselected output subpoints such that one or more output subpoints are assigned to one node and the output subpoint span of the maximum size processing operator is less than the output subpoint span assigned to said collection of nodes;

providing such nodes with a processing program and processing parameters;

passing said seismic data as a linear sequence of input traces through said collection of nodes in a continuous sequence; and for each node of said collection of nodes and for each corresponding output subpoint assigned thereto generating an output trace for said corresponding output subpoint from those input traces whose subpoints fall within the input subpoint span of the processing operator corresponding to said corresponding output subpoint.

2. A method as claimed in claim 1 wherein said processing is Kirchhoff migration.

3. The method for processing seismic data of claim 1 wherein said processing is migration of seismic data.

4. The method for processing seismic data of claim 1 wherein said processing is Kirchhoff redatuming.

5. The method for processing seismic data of claim 1 wherein said processing is 2D time-domain dip moveout.

6. The method for processing seismic data of claim 1 wherein said processing is 3D time-domain dip moveout.

7. A method for migrating seismic data on a multiprocessor computer having multiple interconnected processor nodes, comprising:

(a) providing the multiprocessor computer with the seismic data and with input parameters to perform migration on the seismic data, the seismic data includes input seismic traces identified by subpoints;

(b) calculating migration parameters from some of the input parameters;

(c) determining migration operators from the input parameters, a migration operator of the migration operators representing an amount of sequential input seismic traces in subpoint order that are necessary in a migration process to provide a migrated output trace and a maximum migration operator representing a maximum amount of the sequential input seismic traces from the seismic data that are necessary to obtain a single migrated output trace;

(d) allocating some of the processor nodes as a chain of migration nodes, each migration node of the migration nodes being capable of providing at least one said migrated output trace, the chain of migration nodes having at least as many migration nodes as are necessary to produce an amount of migrated output traces equal to the amount which represents the maximum migration operator;

(e) assigning migration nodes within the chain of migration nodes to provide an operator width of said migrated output traces, the operator width being an amount of said migrated output traces equal to the amount represented by the migration operator for the input traces about to enter the chain of migration nodes;

(f) providing each assigned migration node with processing programs and the migration parameters, the migration parameters for each said assigned migration node including at least one designated output subpoint, the designated output subpoint being a spacial location for a migrated output trace;

(g) passing an amount of the input traces in sequential subpoint order through the assigned migration nodes in a continuous sequence, the amount of the input traces being equal to the operation width; and (h) generating at least one said migrated output trace for each said assigned migration node and for each said designated output subpoint.

8. The method for migrating seismic data according to claim 7 wherein:

step (f) includes identifying a span of said sequential input traces which are processed by the assigned migration node to produce the output trace for the designated subpoint, the span having an amount of said sequential input traces equal to the operator width; and step (h) includes generating at least one said migrated output trace for each said assigned migration node and for each said designated output subpoint by performing a local interpolation of each said input trace that falls within the span of the sequential input traces and summing the interpolated traces within the span to produce the output trace for the designated output subpoint.

9. The method for migrating seismic data according to claim 8 including;

(i) reassigning the migration nodes in the chain of migration nodes as each assigned migration node completes generating at least one said migrated output trace by adding or removing assigned migration nodes in accordance with the migration operator calculated for a next said span of traces to be processed for a next said designated output subpoint for each said assigned migration node; and (j) repeating steps (f) through (h) whereby the input traces pass through the assigned migration node in sequential subpoint order such that the seismic data only passes through the multiprocessor computer once to produce the migrated output traces.

10. The method of migrating seismic data according to claim 7 wherein in step (d) the chain of migration nodes is a nearest-neighbor chain of nodes.

11. The method of migrating seismic data according to claim 7 wherein step (d) also includes allocating some of the processor nodes as preprocessor nodes and one of the processor nodes as a gather node, said preprocessor nodes being assigned to process some of the input traces in parallel, said processing by the preprocessing nodes providing at least one function from a group of functions which include format conversions, amplitude normalization, phase shifting, frequency weighing, blanking, summation, and filtering, this step also including allocating the gather node to be at a front end of the chain of migration nodes whereby the preprocessor nodes send the input traces after preprocessing to the migration node to rearrange the input traces in sequential subpoint order.

12. The method of migrating seismic data according to claim 11 wherein the gather node is a nearest-neighbor of a first migration node in the chain of migration nodes, 13. The method of migrating seismic data according to claim 7 including the step of:
  (i) passing the migrated output traces to postprocessing nodes, said postprocessing nodes being assigned to process some of the output migrated traces in parallel, said processing by postprocessing nodes providing at least one function of a group of functions which include format conversions, amplitude normalization, phase shifting, summation, blanking, and filtering.

14. The method of migrating seismic data according to claim 7 wherein:
  step (d) also allocates at least one of the processor nodes as an operator node, said operator node being dedicated to providing to the migration nodes at least one parameter of a group of migration parameters which include velocities, traveltimes, limits for the migration operator and locations for designated output subpoints; and
  in step (f) the operator node provides the migration parameters to each assigned migration node.

15. The method of migrating seismic data according to claim 7 wherein the method of migrating is Kirchhoff migration.

16. A method for migrating seismic data on a multiprocessor computer having multiple interconnected processor nodes, comprising:
  (a) providing the multiprocessor computer with the seismic data and with input parameters to perform migration on the seismic data, the seismic data includes input seismic traces identified by subpoints;
  (b) calculating migration parameters from some of the input parameters;
  (c) determining migration operators from the input parameters, a migration operator of the migration operators representing an amount of sequential input seismic traces in subpoint order that are necessary in a migration process to provide a migrated output trace a maximum migration operator representing a maximum amount of the sequential input seismic traces from the seismic data that are necessary to obtain a single migrated output trace;
  (d) allocating some of the processor nodes as chains of migration nodes, each chain having a length corresponding to the amount of migration nodes in that chain, each migration node of the migration nodes being capable of providing at least one partial migrated output trace, each chain of the chains of migration nodes having at least as many migration nodes as are necessary to produce an amount of partially migrated output traces equal to the amount which represents the maximum migration operator;
  (e) assigning migration nodes within the chains of migration nodes to provide an operator width of said partial migrated output traces, the operator width being an amount of said migrated output traces equal to the amount represented by the migration operator of the input traces about to enter said chains of migration nodes;
  (f) providing each assigned migration node with processing programs and the migration parameters, the migration parameters including the assignment of designated output subpoints to the assigned migration nodes of each said chain such that each chain has the same said designated subpoints assigned, the migration parameters also including at least one designated output subpoint for each said assigned migration node, the designated subpoints being spacial locations for migrated output traces and the designated output subpoint being a spacial location for a migrated output trace;
  (g) passing an amount of the input traces in subpoint order through the assigned migration nodes of the chains in a continuous sequence, the input traces being distributed to each said chain in round-robin fashion such that each chain receives an amount of traces equivalent to a ratio of its length to a total length of the said chains of migration nodes, the amount of the input traces passed through the chains being equal to the operation width; and
  (h) generating at least one partial migrated output trace for each said assigned migration node and for each said designated output subpoint.
  (i) combining the partial migrated output trace for each said designated output subpoint to obtain the migrated output trace for each said designated output subpoint.

17. The method for migrating seismic data according to claim 16 wherein:
  step (f) includes identifying a span of said sequential input traces which are processed by the assigned migration node to produce the partial output trace for the designated subpoint, the span having an amount of said sequential input traces equal to the operator width; and
  step (h) includes generating at least one said partial migrated output trace for each said assigned migration node and for each said designated output subpoint by performing a local interpolation of each said input trace that falls within the span of the sequential input traces distributed to that said chain and summing the interpolated traces within the span distributed to that said chain to produce the partial output trace for the designated output subpoint.

18. The method for migrating seismic data according to claim 16 including;
  (j) reassigning the migration nodes in each said chain of migration nodes as each assigned migration node completes generating at least one said partial migrated output trace by adding or removing assigned migration nodes in accordance with the migration operator for a next said span of traces to be processed for a next said designated output subpoint for each said assigned migration node; and
  (k) repeating steps (f) through (i) whereby the input traces pass through the chains in subpoint order such that the seismic data only passes through the multiprocessor computer once to produce the migrated output traces.

19. The method of migrating seismic data according to claim 16 wherein in step (d) the chains of migration nodes are arranged such that each said chain is a nearest-neighbor chain of nodes.

20. The method of migrating seismic data according to claim 16 wherein step (d) also includes allocating some of the processor nodes as preprocessor nodes and one of the processor nodes as a gather node, said preprocessor nodes being assigned to process some of the input traces in parallel, said processing of preprocessor nodes providing at least one function from a group of functions which include format conversions, amplitude normalization, phase shifting, frequency weighing, blanking, summation, and filtering, this step also including allocating the gather node to be at a front end of the chain of migration nodes whereby the preprocessor nodes send the input traces after preprocessing to the migration node which rearranges the input traces in sequential subpoint order and distributes the input traces in said round-robin fashion to the chains of migration nodes.

21. The method of migrating seismic data according to claim 16 wherein:
   step (d) also includes allocating some of the processor nodes as postprocessor nodes;
   wherein in step (i) the partially migrated output traces are passed to postprocessing nodes which combine each said partial migrated output trace into the migrated output trace for each said designated output subpoint.

22. The method of migrating seismic data according to claim 21 wherein step (i) also includes using said postprocessing nodes to process the output migrated traces, said processing by postprocessing nodes providing at least one function from a group of functions which include format conversions, amplitude normalization, phase shifting, summation, blanking, and filtering.

23. The method of migrating seismic data according to claim 16 wherein:
   step (d) also allocates at least one of the processor nodes as an operator node, said operator node being dedicated to providing to the migration nodes at least one parameter of a group of migration parameters which include velocities, traveltimes, limits for the migration operator and locations for designated output subpoints; and
   in step (f) the operator node provides the migration parameters to each assigned migration node.

24. The method of migrating seismic data according to claim 16 wherein the method of migrating is Kirchhoff migration.

25. A method for Kirchhoff migrating seismic data on a multiprocessor computer having multiple interconnected processor nodes, comprising:
   (a) providing the multiprocessor computer with the seismic data and with input parameters to perform Kirchhoff migration on the seismic data, the seismic data including input seismic traces identified by subpoints;
   (b) calculating migration parameters from some of the input parameters;
   (c) determining migration operators from the input parameters, a migration operator of the migration operators representing an amount of sequential input seismic traces in subpoint order that are necessary in a migration process to provide a migrated output trace and a maximum migration operator representing a maximum amount of the sequential input seismic traces from the seismic data that are necessary to obtain a single migrated output trace;
   (d) allocating some of the processor nodes as a nearest-neighbor chain of migration nodes, each migration node of the migration nodes being capable of providing at least one said migrated output trace, the chain of migration nodes having at least as many migration nodes as are necessary to produce an amount of migrated output traces equal to the amount which represents the maximum migration operator;
   (e) allocating some of the processor nodes as preprocessor nodes, postprocessor nodes, an operator node and a gather node, the preprocessor nodes being allocated ahead of said chain of migration nodes, the gather node being allocated as a nearest-neighbor to a first migration node in said chain of migration nodes, and the post processor nodes being allocated behind said chain of migration nodes, said operator node being dedicated to providing to the migration nodes at least one parameter of a group of migration parameters which include velocities, traveltimes, limits for the migration operator and locations for designated output subpoints;
   (f) passing input traces through said preprocessor nodes, said preprocessor nodes being assigned to process some of the input traces in parallel, said processing by the preprocessing nodes providing at least one function from a group of functions which include format conversions, amplitude normalization, phase shifting, frequency weighing, blanking, summation, and filtering;
   (g) rearranging the input traces in sequential subpoint order at the gather node;
   (h) assigning migration nodes within the chain of migration nodes to provide an operator width of said migrated output traces, the operator width being an amount of said migrated output traces equal to the amount represented by the migration operator for the input traces about to enter the chain of migration nodes;
   (i) providing each assigned migration node with processing programs and the migration parameters, the migration parameters for each said assigned migration node being provided by the operation node, said migration parameters including at least one designated output subpoint, the designated output subpoint being a spacial location for a migrated output trace, the migration parameters also including identifying a span of said sequential input traces which are processed by the assigned migration node to produce the output trace for the designated subpoint, the span having an amount of said sequential input traces equal to the operator width;
   (j) passing an amount of the input traces in sequential subpoint order through the assigned migration nodes from the gather node in a continuous sequence, the amount of the input traces being equal to the operation width;
   (k) generating at least one said migrated output trace for each said assigned migration node and for each said designated output subpoint by performing a local interpolation of each said input trace that falls within the span of the sequential input traces and summing the interpolated traces within the span to produce the migrated output trace for the designated output subpoint;

(l) passing the migrated output traces through the postprocessing nodes, said postprocessing nodes being allocated to process some of the output traces in parallel, said processing by the postprocessing nodes provides at least one function from a group of functions which include format conversions, amplitude normalization, phase shifting, summation, blanking, and filtering;

(m) reassigning the migration nodes in the chain of migration nodes as each assigned migration node completes generating at least one said migrated output trace by adding or removing assigned migration nodes in accordance with the migration operator for a next said span of traces to be processed for a next said designated output subpoint for each said assigned migration node; and (n) repeating steps (f) through (m) whereby the input traces pass through the assigned migration node in sequential subpoint order such that the seismic data only passes through the multiprocessor computer once to produce the migrated output traces.

* * * * *